(12) United States Patent
Souza et al.

(10) Patent No.: US 9,083,717 B2
(45) Date of Patent: Jul. 14, 2015

(54) DATA FLOW IN PEER-TO-PEER NETWORKS

(75) Inventors: Victor Souza, Solna (SE); Stefan Hellkvist, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 629 days.

(21) Appl. No.: 13/379,201

(22) PCT Filed: Jun. 18, 2009

(86) PCT No.: PCT/EP2009/057632
§ 371 (c)(1),
(2), (4) Date: Dec. 19, 2011

(87) PCT Pub. No.: WO2010/145709
PCT Pub. Date: Dec. 23, 2010

(65) Prior Publication Data
US 2012/0102151 A1 Apr. 26, 2012

(51) Int. Cl.
*H04L 29/08* (2006.01)
*H04L 29/06* (2006.01)
(52) U.S. Cl.
CPC .............. *H04L 67/104* (2013.01); *H04L 69/14* (2013.01)
(58) Field of Classification Search
None
See application file for complete search history.

(56) References Cited

U.S. PATENT DOCUMENTS

| | | | |
|---|---|---|---|
| 5,907,676 A * | 5/1999 | Fujishiro et al. .............. | 709/203 |
| 6,182,141 B1 * | 1/2001 | Blum et al. ................... | 709/227 |
| 6,192,414 B1 * | 2/2001 | Horn ............................. | 709/239 |
| 6,330,560 B1 * | 12/2001 | Harrison et al. .............. | 709/223 |
| 7,149,816 B1 * | 12/2006 | Port et al. ..................... | 709/250 |
| 7,346,909 B1 * | 3/2008 | Eldar et al. ................... | 719/312 |
| 7,424,710 B1 * | 9/2008 | Nelson et al. ..................... | 718/1 |
| 7,551,614 B2 * | 6/2009 | Teisberg et al. ............... | 370/389 |
| 7,660,306 B1 * | 2/2010 | Eiriksson et al. ............. | 370/392 |
| 7,689,702 B1 * | 3/2010 | Tripathi et al. ............... | 709/230 |
| 7,724,658 B1 * | 5/2010 | Eiriksson et al. ............. | 370/229 |
| 7,826,350 B1 * | 11/2010 | Michailidis et al. .......... | 370/229 |
| 7,831,720 B1 * | 11/2010 | Noureddine et al. ......... | 709/227 |
| 7,843,906 B1 * | 11/2010 | Chidambaram et al. ...... | 370/386 |
| 8,171,147 B1 * | 5/2012 | Kaufman et al. ............. | 709/228 |
| 8,443,057 B1 * | 5/2013 | Kaufman et al. ............. | 709/219 |
| 8,583,832 B2 * | 11/2013 | Krzanowski et al. ......... | 709/250 |
| 8,671,135 B1 * | 3/2014 | Joshi et al. .................... | 709/202 |
| 2003/0167330 A1 * | 9/2003 | Cohen et al. .................. | 709/226 |
| 2004/0042483 A1 * | 3/2004 | Elzur et al. .................... | 370/463 |
| 2004/0221059 A1 * | 11/2004 | Bush ............................. | 709/238 |
| 2005/0165932 A1 * | 7/2005 | Banerjee et al. .............. | 709/226 |
| 2006/0129676 A1 * | 6/2006 | Modi et al. .................... | 709/227 |
| 2007/0150558 A1 | 6/2007 | Teodosiu et al. | |

(Continued)

*Primary Examiner* — Greg C Bengzon

(57) ABSTRACT

There is described a client node for use in a network. The client node comprises a transmitter for requesting data from the network. A processor is operatively connected to the transmitter, and has installed thereon an operating system and an application. A receiver for receiving data from the network is operatively connected to the processor. The application is arranged to request content data from the network by opening a transport socket to the operating system. The operating system is arranged to establish contact with a master peer server in the network, receive a list of sources of the content data from the master peer server through such transport socket signalling, and establish contact with at least one source from the list of sources. The application is arranged to receive the content data from the at least one source without being aware that the content is delivered by at least one source from a list of sources. The list of sources may include nodes in a P2P network.

11 Claims, 4 Drawing Sheets

(56) References Cited

U.S. PATENT DOCUMENTS

| | | | |
|---|---|---|---|
| 2007/0297334 A1* | 12/2007 | Pong | 370/235 |
| 2008/0046517 A1* | 2/2008 | Frohm et al. | 709/206 |
| 2008/0059644 A1* | 3/2008 | Bakke et al. | 709/230 |
| 2008/0195737 A1* | 8/2008 | Jokela et al. | 709/227 |
| 2009/0100128 A1 | 4/2009 | Czechowski et al. | |
| 2009/0199250 A1* | 8/2009 | Assouline et al. | 725/96 |
| 2010/0085975 A1* | 4/2010 | Wang et al. | 370/395.53 |

* cited by examiner

DATA FLOW IN PEER-TO-PEER NETWORKS

TECHNICAL FIELD

The present invention relates to data flow in Peer-to-Peer (P2P) networks. In particular, the invention relates to a transparent transport protocol for use by peers in a P2P network.

BACKGROUND

Many applications today utilise peer-to-peer (P2P) technology to provide robust, low-cost, scalable delivery of content to end-users. P2P technology is built upon the concept of cooperative peers that share part of their resources with a community in exchange for a service or access to content.

Initially utilised for illegal file sharing, P2P is today utilised for delivery of legal media content on the Internet (e.g. BBC's iPlayer, Joost), telephony (e.g. Skype), free software (e.g. distribution of Linux live CD's over BitTorrent), and service packages (delivery of Microsoft patches over BitTorrent), among others. More and more service providers are realising the benefits of the P2P delivery model, resulting in a general shift towards this type of architecture.

The success of P2P technology is mainly due to its low cost and high scalability. Providers of content have a near-zero cost for delivery of large amounts of data to a large community of users.

In the classical client-server model, the resources on the server side need to be dimensioned to accommodate the total number of simultaneous users of the service. This includes processing power, memory capacity, streaming capacity, read/write speed, bandwidth among others. Conversely, when P2P technology is used, each peer donates part of its resources for the overall good of the network. In order to enable the nodes that would have been clients under the client server model to carry out this function, specific client application software needs to be developed. Different applications generally have different requirements, and different application-specific software generally needs to be installed in a client computer for each application that uses P2P technology.

The development of a peer-to-peer application is not a simple task. Many different companies and open source communities have developed their own proprietary peer-to-peer protocol. These protocols are not interoperable. Efforts to standardise a peer-to-peer protocol have started recently, since electronic vendors (e.g. Set Top Box (STB) vendors) wish to connect their devices to P2P networks, and they cannot implement dozens of different protocols in their equipment which typically possesses very limited resources.

If a service provider wants to utilise P2P technologies, a lot of functions need to be handled by the client applications. This means that "special" software clients need to be implemented to accommodate the needs of a P2P mechanism. Currently, a service provider cannot deliver content using a P2P system without requiring users to install a P2P client. The design and development of new P2P clients is a very time consuming task, and the new applications need to implement a lot of functions already implemented by other applications in the client. This is clearly wasteful and costly.

FIG. 1 illustrates some of these functions. Consider a client in a network, and suppose a P2P application 101 is installed on the client. The P2P application 101 needs to control and manage the sockets 111, 112, 113, 114 in the transport layer 102 open to other peers 121, 122, 123, 124. For efficiency reasons this process needs to be multi-threaded, and thus is very error prone. Moreover, the application 101 needs to pull data from different peers (control of data flow) and, since the pieces can come out of order the application must put them together in a structured way. Furthermore, the application 101 needs to ensure availability of content, which again implies that it needs to perform peer management by taking a close look at the connections' characteristics.

Since these functions need to be implemented by all P2P applications, most of which are different, many separate non-standardized protocols exist. Furthermore, any new P2P application needs to re-implement all these functions even though other applications on a client computer may already be doing so.

It would therefore be desirable to provide a mechanism to allow applications to utilise P2P technologies in a simpler way.

SUMMARY

It is an object of the present invention to overcome or at least mitigate the problems discussed above.

In accordance with one aspect of the present invention there is provided a client node for use in a network. The client node comprises a transmitter for requesting data from the network. A processor is operatively connected to the transmitter, and has installed thereon an operating system and an application. A receiver for receiving data from the network is operatively connected to the processor. The application is arranged to request content data from the network by opening a transport socket to the operating system. The operating system is arranged to establish contact with a master peer server in the network which is the initial source of content, receive a list of sources of the content data from the master peer server through such transport socket signalling, and establish contact with at least one source from the list of sources. The application is arranged to receive the content data from the at least one source without being aware that the content is delivered by at least one source from a list of sources. The list of sources may include nodes in a P2P network or supporting servers.

This allows the client application to be transparent to the use of P2P mechanisms. In other words, the client application need not be aware of the utilisation of a P2P delivery mechanism.

The placement of P2P management functions into the operating system network stack allows them to be used by all the different applications running on top of it. Applications can interact with a P2P transport layer library to get a reference to a P2P transport descriptor (e.g., a socket). This simplifies the development of peer-to-peer client applications.

In particular, this arrangement allows for a mode of operation where the client application has no awareness of the presence of multiple peers. The client application behaves as though it is interacting with a single server, the master peer server. The client application sees one socket that feeds content in a similar manner to that used in the traditional client-server socket. A server can therefore decide to use peer-to-peer delivery with the assistance of a number of distributed peers (or other servers) without placing any major impact on the client application, and even without informing it that this is taking place. This provides servers with a great deal of flexibility: a server can serve clients by itself at periods of low demand, or use a peer-to-peer network at periods of high load.

The operating system may be arranged to control opening and/or closing of sockets towards the at least one source from which the content data is received; and/or control data flow between the at least one source and the application; and/or ordering data chunks received from different peers; and/or ensure content availability to the application; and/or determine what content to retrieve from each source.

In accordance with another aspect of the present invention there is provided a server for use in a network. The server comprises a receiver for receiving a request for content data from a client node in the network and a transmitter for transmitting data into the network. A processor is operatively connected to the receiver and transmitter, and arranged to establish a connection via a three-way handshake with the client node. The processor is further arranged to identify whether there are sources for the content data available in the network and, if sources are available, send a list of said sources to the client node. The list of sources may be sent to the client node using transport socket primitives, and may include nodes that belong to a cluster the server is part of.

In accordance with another aspect of the present invention there is provided a method of delivering content data to an application installed on a client node in a network. The method comprises opening a transport socket from the application to an operating system installed on the client node. Contact is established between the operating system and a master peer server in the network. A list of sources of the content data is obtained at the master peer server, and sent from the master peer server to the operating system. A connection is opened from the client node to at least one source from the list of sources. Content data is received at the application from the at least one source, the use of multiple sources being transparent to the application.

The master peer server may obtain the list of sources of the content data by querying nodes in the network.

The invention also provides an application program adapted to be executed on a client node in a network. The application program is arranged to request content data from the network by opening a transport socket to an operating system installed on the client node. The transport socket causes the operating system to establish contact with a master peer server in the network, receive a list of sources of the content data from the master peer server, and establish contact with at least one source from the list of sources, so that the application can receive the content data from the at least one source.

The invention also provides an operating system program adapted to be executed on a client node in a network. The operating system program is arranged to receive a request from an application installed on the client node to receive content data from the network. It then acts to establish a connection with a master peer server in the network, and receive a list of sources of the content data from the master peer server.

The operating system establishes a connection with at least one source from the list of sources, and enables the application to receive the content data from the at least one source.

The operating system program may further be arranged to control opening and/or closing of sockets towards the at least one source from which the content data is received; and/or control data flow between the at least one source and the application; and/or ordering data chunks received from different peers; and/or ensure content availability at the sources; and/or determine what content to retrieve from each source.

The invention also provides a network stack adapted to operate on a client node in a network. The network stack is arranged to establish a connection with a master peer server in the network and receive a list of sources of the content data from the master peer server. It also establishes a connection with at least one source from the list of sources, and enables an application installed on the client node to receive the content data from the at least one source.

The invention thus moves down certain functions previously implemented by the applications to the transport layer. Instead of having them implemented by every P2P application (in the application itself), these functions are implemented as part of the operating system network stack. It can thus be seen as an enhanced new type of socket, a system library that can be used whenever deemed suitable.

DETAILED DESCRIPTION

Figure 1:
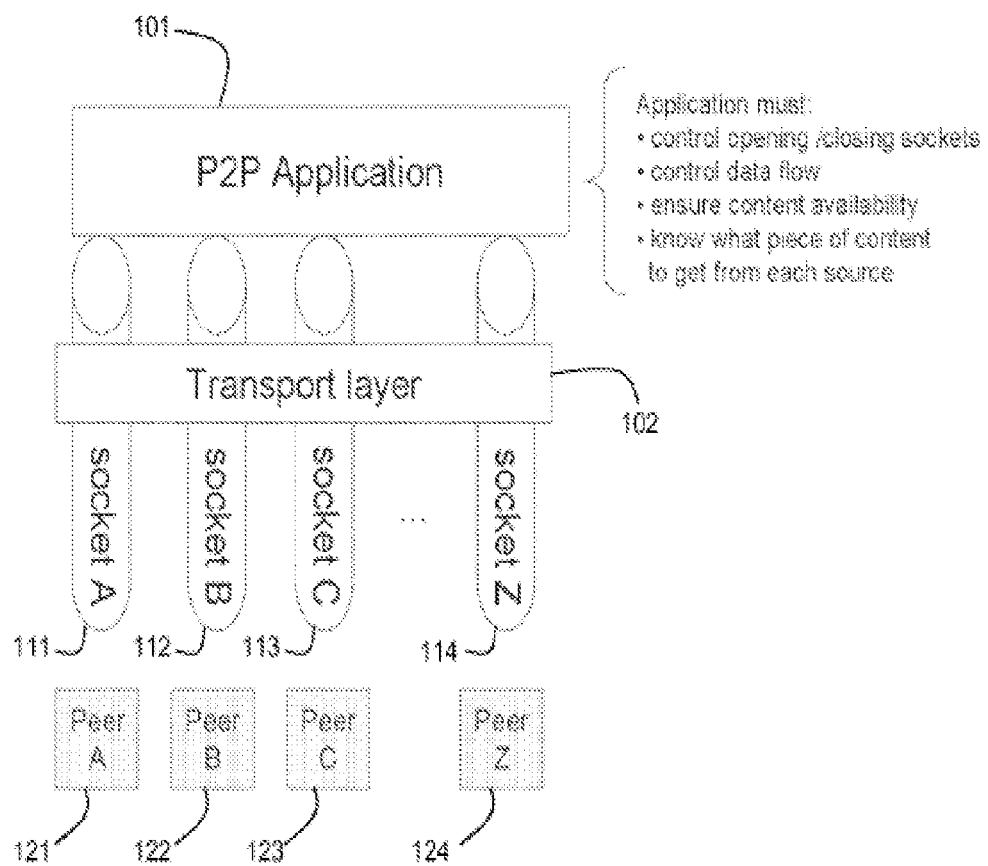
FIG. 1 is a schematic illustration of a client opening sockets towards peers in a traditional P2P network.
Figure 2:
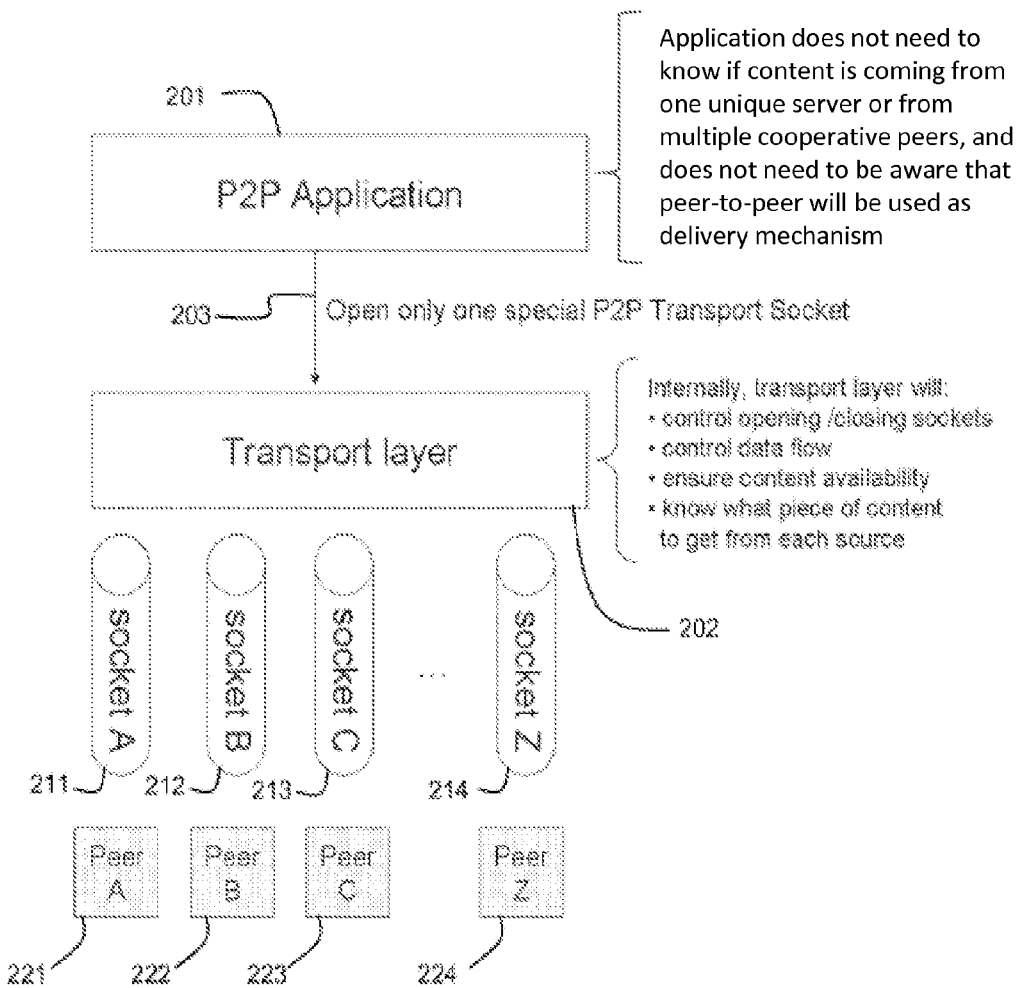
FIG. 2 is a schematic illustration of a P2P application opening a P2P transport socket.

FIG. 2 is an illustration of a P2P application 201 installed on a client in a network. A single socket 203 (hereafter referred to as a "P2P transport socket") is opened towards the transport layer 202 on the client. The functions that are implemented by the P2P Transport Socket are:

Controlling opening of sockets 211, 212, 213, 214 to new peers 221, 222, 223, 224;

Controlling closing of sockets to low performing peers;

Building one unique sequential data buffer out of the data chunks downloaded from different sources (peers 221, 222, 223, 224)

Retransmission in case of packet loss or corrupted data chunks

Managing download rate according to policies (e.g., download more from more robust peers, download more from closer peers).

These functions are all handled by the transport layer 202. The P2P application 201 uses the P2P Transport Socket 203 in the same way as standard client applications use TCP sockets. The P2P application 201 does not need to know if the content is really coming from one unique server or from multiple cooperative peers 221, 222, 223, 224, and does not need to be aware of the fact that peer-to-peer will be used as a delivery mechanism. The connections towards multiple peers 221, 222, 223, 224 are hidden from the application 201, that sees one unique socket 203. Full control over the connections with the peers is given to the transport layer 202.

In other words, for any given client computer, the establishment of connections with either a server or with other peers should be handled by the network stack of the operating system of the computer, rather than by an application requesting content. For example, consider a browser for viewing multimedia data. The browser can request data from a network, but will not know whether the data is provided from a single server or a multitude of different sources (peers). The operating system of the computer on which the browser is installed controls the connections to other computers, and sets up the connections with other nodes. There is no need to install specific applications for P2P use: the P2P aspect is handled by the operating system.

Figure 3:
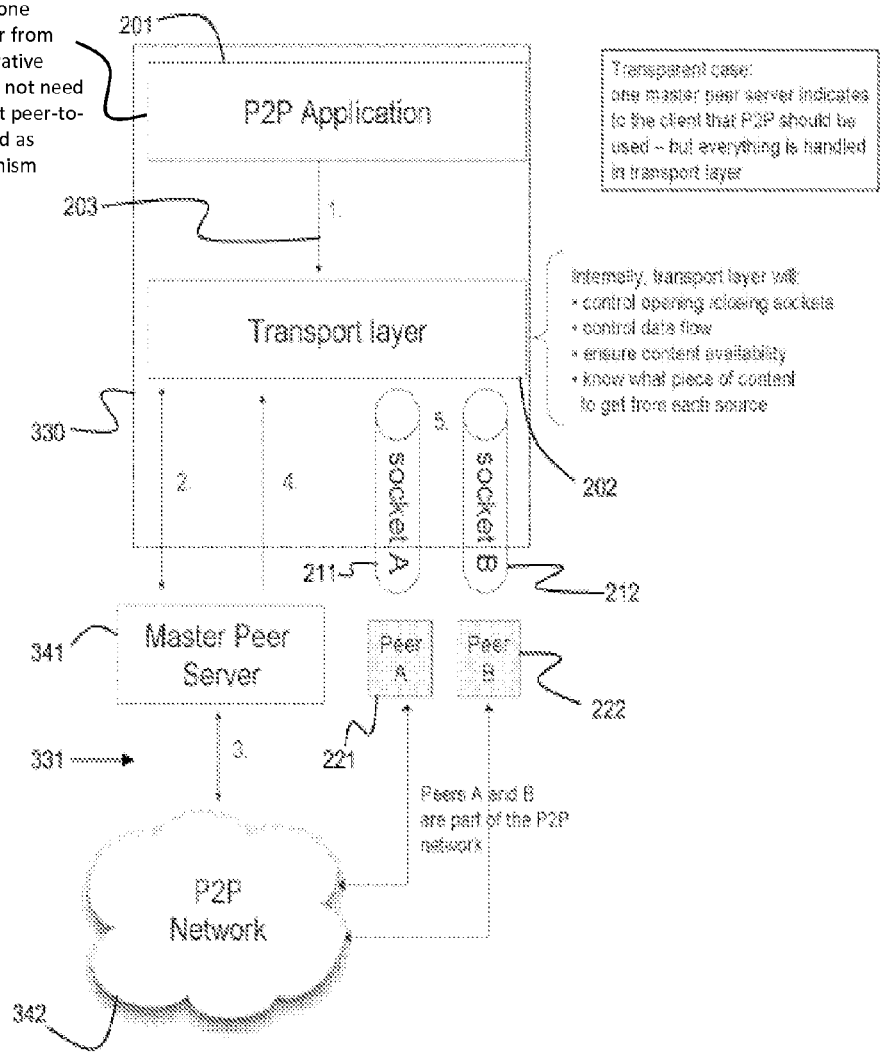
FIG. 3 is a schematic illustration of the interaction between a client and a network illustrating the operation of a Master Peer Server.

FIG. 3 is a schematic diagram illustrating the operation of the P2P application 201 and the interaction between a client 330 and network 331 when establishing a connection with peers for delivery of content. The P2P application 201 is installed on the client 330. When a network connection is to be established a P2P Transport Socket 203 is created by the application 201 towards a central server 341 in the network 311. The transport service offered by the P2P Transport Socket 203 is reliable and shares many similarities with the way TCP sockets work. However, this transport service gives control over the management of further connections to the transport layer.

In this example, the process of establishment of the Peer-to-peer Transport Socket 203 connection is based on TCP, although it will be appreciated that other protocols may also be used. Initially the client 330 opens a connection to a server (hereinafter referred to as the "Master Peer Server") 341 which can later signal the usage of multiple cooperative peers 221, 222 back to the client 330. The communication starts as a normal client server interaction which is later amended by the use of cooperative peers. Anything the client P2P application 201 writes to the P2P Transport Socket 203 (in step 1 below) is sent only to the Master Peer Server 341. Referring back to FIG. 3, the details of the process of establishment of a connection are as follows:

1. The P2P Application utilises a local system call to open the P2P Transport Socket 203 (e.g. to request access to a large media content). This contacts the Master Peer Server 341.
2. The Master Peer Server 341 establishes a connection via a 3-way handshake
3. The Master Peer Server 341 queries a P2P network 342 to find other sources of the large media content.
4. The Master Peer Server 341 sends a list of alternative sources, in this case two peers 221, 222, to the client 330.
5. The P2P Transport Socket 203 opens multiple connections to the two peers 221, 222 which are designated sources of content.

It will be appreciated that Peer A 221 and Peer B 222 could be either clients or part of a distributed cloud that is under the administrative power of the service provider.

Figure 4:
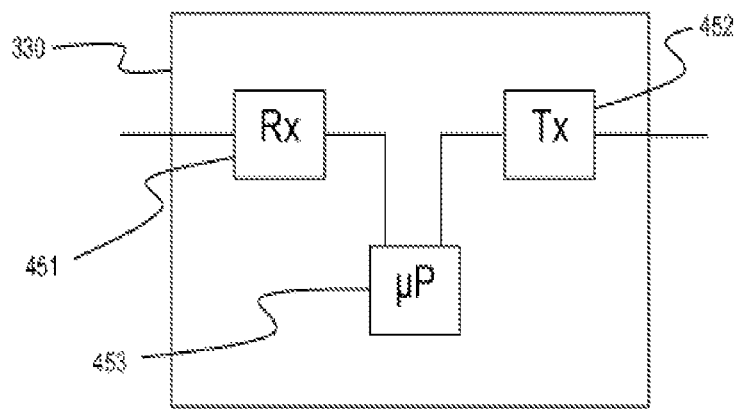
FIG. 4 is a schematic illustration of a client node.

FIG. 4 is a schematic illustration of the architecture of the client 330. The client 330 includes a receiver 451 which receives data from the network. The receiver 451 is operatively connected to a processor 453, which is itself operatively connected to a transmitter 452 for sending data into the network. As discussed above, the processor 453 has installed thereon an application and an operating system, and it is the network stack of the operating system that handles the establishment of connections with either a server or with other peers.

Figure 5:
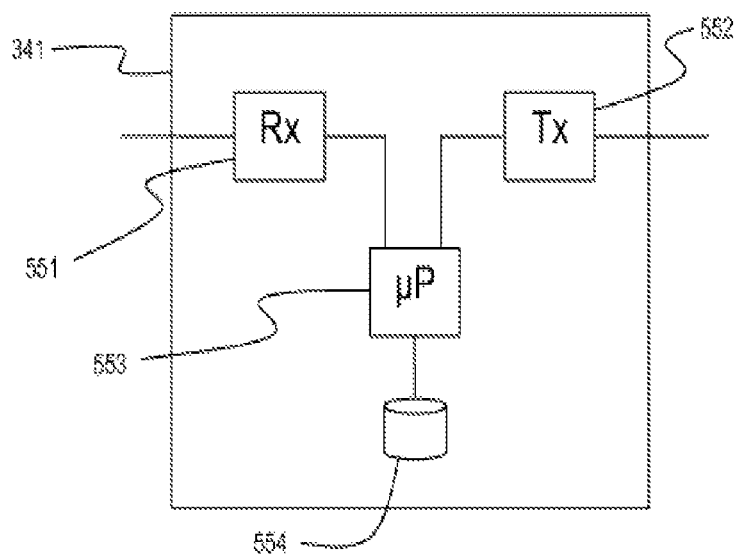
FIG. 5 is a schematic illustration of a master peer server node.

FIG. 5 is a schematic illustration of the architecture of the master peer server 341. The server 341 includes a receiver 551 which receives a request for content data from the client 330. A transmitter 552 transmits data into the network. A processor 553 is operatively connected to both. The processor 553 is responsible for establishing a connection via a three-way handshake with the client 330. The processor 553 also identifies whether there are sources for the content data available in the network. If sources are available, the processor ensures that a list of these sources is sent to the client node. A data store 554 is connected to the processor 553.

The P2P Transport Socket 203 should be transparent to client applications, and therefore the primitives of usage of the socket should not be changed for the client applications. In one embodiment of this invention the primitives utilised are the same as TCP. Those are open, close, abort, receive, send and status.

The server side (i.e. the Master Peer Server 341) needs to be able to send a transport message to the client transport layer 202 to inform the client 330 about the use of multiple cooperative peers (step 4 in FIG. 3). In Step 4, the Master Peer Server 341 utilises a fork primitive to send the list of peers 221, 222 to the requester 330. The client transport layer 202 will act on the fork message and will start the connections to the assisting peers 221, 222.

Moving these functions to the transport layer is compatible with the Open Systems Interconnection Reference Model (OSI) and Internet model. According to these models, the transport layer should provide transparent transfer of data between applications, delivering a (possibly reliable) data transfer services to the applications. Reliability is implemented through flow control (e.g., TCP sliding window), segmentation, and error control. The arrangement described above adds the management of peer connections to the list of services provided by the transport layer. The 1-to-1 transport layer service model has effectively been extended to a many-to-1 where the management of data exchange is performed by the proposed P2P Transport service.

The arrangement described enables applications to be transparent to the use of peer-to-peer technologies. Content and service providers can use the P2P Transport Socket without having to develop complex P2P client applications. Existing applications can be directly ported to the environment containing the proposed transport layer and still work. The system allows servers to redirect the client to multiple peers without having the client to be aware of it. Furthermore, since the P2P functions will be implemented directly on the network stack the performance of the P2P system as a whole will be superior.

The invention claimed is:

1. A client node apparatus for use in a network, comprising:
a transmitter for requesting data from the network;
a processor operatively connected to the transmitter and having access to an operating system and an application in the client node apparatus; and,
a receiver operatively connected to the processor for receiving data from the network; wherein:
the application is configured to request content data from the network by opening a transport socket to the operating system;
the operating system is configured to establish contact with a master peer server in the network, receive a list of sources of the content data from the master peer server through transport socket signalling, and establish contact with multiple sources from the list of sources; and,
the application is configured to receive the content data from the multiple sources, through the transport socket, without being aware that the content is delivered by multiple sources from a list of sources, and is further configured to allow a server to redirect the client node apparatus to multiple peers without being aware of the redirection, and
the list of sources includes nodes in a peer-to-peer network.

2. The client node apparatus of claim 1, wherein the list of sources includes the master peer server.

3. The client node apparatus of claim 1, wherein the operating system is further configured to perform one or more of the following functions:
control opening and/or closing of sockets towards the at least one source from which the content data is received;
control data flow between the at least one source and the application;
ensure content availability to the application; and,
determine what content to retrieve from each source.

4. A method of delivering content data to an application installed on a client node in a network, the method comprising:

opening a transport socket from the application to an operating system installed on the client node;

establishing contact between the operating system and a master peer server in the network;

obtaining a list of sources of the content data at the master peer server;

sending the list of sources from the master peer server to the operating system;

opening a connection from the client node to multiple sources from the list of sources; and, receiving the content data at the application from the multiple sources through the transport socket, wherein the application is not aware that the content is delivered by multiple sources, and wherein the application allows a server to redirect the client node to multiple peers without being aware of the redirection, and wherein the list of sources includes nodes in a peer-to-peer network.

5. The method of claim 4, wherein the master peer server obtains the list of sources of the content data by querying nodes in the network.

6. The method of claim 4, wherein the sources of content data are nodes in a peer-to-peer network.

7. A non-transitory computer-readable medium storing an application program in a client node of a network, the application program adapted to be executed on the client node and configured to:

request content data from the network by opening a transport socket to an operating system installed on the client node, the transport socket causing the operating system to establish contact with a master peer server in the network, receive a list of sources of the content data from the master peer server, and establish contact with multiple sources from the list of sources, so that the application can receive the content data from the multiple sources, through the transport socket, without being aware that the content is delivered by multiple sources from a list of sources and so that the application can allow a server to redirect the client node to multiple peers without being aware of the redirection, wherein the list of sources includes nodes in a peer-to-peer network.

8. A non-transitory computer-readable medium storing an operating system program in a client node of a network, the operating system adapted to be executed on the client node and configured to:

receive a request from an application installed on the client node to receive content data from the network;

establish a connection with a master peer server in the network;

receive a list of sources of the content data from the master peer server;

establish a connection with multiple sources from the list of sources; and, enable the application to receive the content data from the multiple sources, through the transport socket, without being aware that the content data is delivered by multiple sources from a list of sources, and without the application being aware when a server redirects the client node to multiple peers, wherein the list of sources includes nodes in a peer-to-peer network.

9. The non-transitory computer-readable medium claim 8, wherein the operating system program is further configured to perform one or more of the following functions:

control opening and/or closing of sockets towards the at least one source from which the content data is received;

control data flow between the at least one source and the application;

ensure content availability at the sources; and, determine what content to retrieve from each source.

10. A client node apparatus having installed thereon the operating system program of claim 8.

11. A network stack stored in a non-transitory computer-readable medium in a client node apparatus of a network and adapted to operate on the client node apparatus, the network stack configured to cause the client node apparatus to:

establish a connection with a master peer server in the network;

receive a list of sources of the content data from the master peer server;

establish a connection with multiple sources from the list of sources; and, enable an application installed on the client node apparatus to receive the content data from the multiple sources without being aware that the content is delivered by multiple sources from a list of sources, wherein the list of sources includes nodes in a peer-to-peer network.

* * * * *